May 12, 1953
B. ABBOTT
2,638,299
DISPLAY MOUNT
Filed May 7, 1948
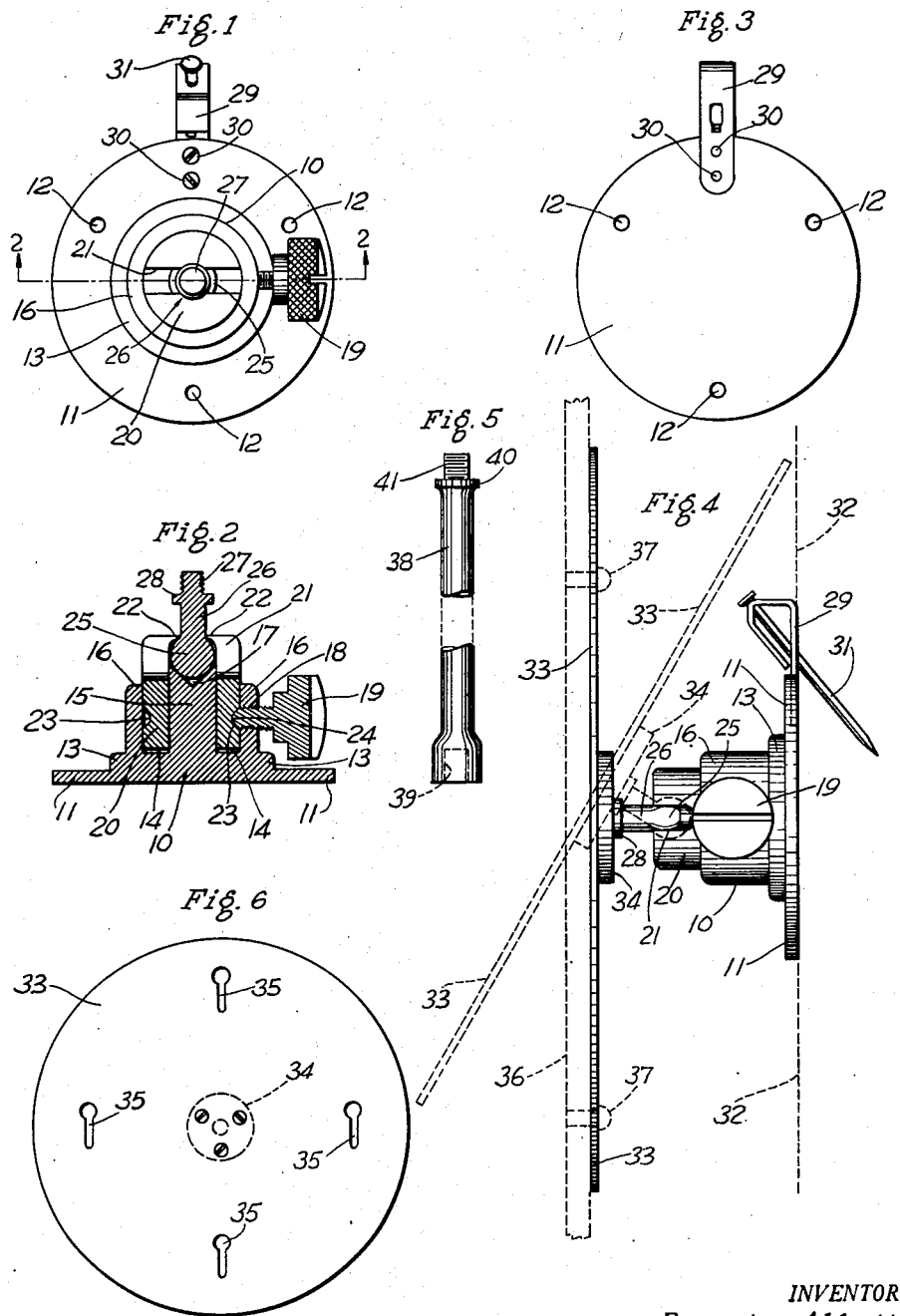
INVENTOR.
Berenice Abbott
BY
Lackenbach & Hirschman
ATTORNEYS Patented May 12, 1953

2,638,299

UNITED STATES PATENT OFFICE 2,638,299

DISPLAY MOUNT

Berenice Abbott, New York, N. Y., assignor to House of Photography, Inc., New York, N. Y., a corporation of New York Application May 7, 1948, Serial No. 25,620

1 Claim. (Cl. 248—181)

The present invention relates to mounts, and in particular to mounts for pictures, showcards, and other objects to be displayed on walls, in show windows and the like.

The general object of the invention is to provide a novel, simple, inexpensive, and practicable mount which may be permanently attached to a wall, or to a floor, as of a show window, or to any other support, and upon which a display article may be temporarily secured and presented to view in any of a considerable variety of positions.

A further object is to provide a universal mount which may be readily adjusted without disturbing its attachment to a fixed surface, so that an object supported by the mount may be presented to view in any of a variety of planes, and may then be secured in a desired position.

Another object is to provide such a mount to which an object to be displayed may be secured thereto with a minimum of effort without the use of screws or other manipulatable parts.

The mount of the present invention is of particular use in photographers' and art shops for displaying photographs and other pictures; and is equally useful as a means for displaying a showcard or the like in different kinds of shops and shop windows. While the mount is well suited for displaying flat or sheet objects, such as mounted photographs and other pictures, showcards, and other objects of like shape, the mount may also serve to support a variety of relatively light objects of merchandise which are themselves mounted upon a base of sheet material. It will be understood that the utility of the mount is not restricted to objects of sheet-like shape, although it is specially suited for supporting such objects, as a particular feature of the mount is that a sheetlike object carried thereon may be presented to view at different angles with respect to a wall or other support to which the mount itself may be permanently attached.

The mount is also of use in the photographic art as a means of supporting photographic printing paper in any one of a variety of planes with respect to the axis of rays of light projected thereon for the purpose of obtaining a distorted print.

The mount comprises a base assembly from which a universally mounted stud protrudes, and a plate or table member secured to the outer end of the stud. The base assembly is adapted to be supported on a suitable surface; and the plate or table member is constructed to support securely on its frontal surface a display object which is provided with simple keys or the like suited to engage keyways or slots provided in said plate or table member. The universal mounting of the stud on the base is adapted to be locked so that after the stud and plate or table member have been selectively positioned angularly with respect to the base assembly the position is permanently maintained.

The invention will be more fully understood from the following description taken together with the accompanying drawing, in which Fig. 1 is a front view of the base assembly of the mount;

Fig. 2 is the section 2—2 of Fig. 1;

Fig. 3 is a rear view of the base assembly of the mount;

Fig. 4 is a side view of the mount, indicating in dotted lines a vertical surface to which the mount may be permanently attached and also part of a sheetlike object, e. g., a mounted photograph, supported by the mount.

Fig. 5 is an elevational view of a suitable extension element by means of which an object supported by the mount may be disposed at a greater distance from the surface to which the mount is attached; and Fig. 6 is a front view, on reduced scale, of a plate, or table, forming part of the mount and to which an object supported thereby may be attached.

In the form of the invention illustrated in the drawing, the base assembly comprises four elements whose cooperating relationship is shown in axial section in Fig. 2. That portion of the assembly which, in use, abuts a surface to which the mount is more or less permanently attached, is a cylindrical element 10 one end of which is provided with a wide flange 11. The flange 11, as seen in Figs. 1 and 3 is provided with a plurality of screw or nail holes 12, 12, by means of which the mount may be attached to a supporting surface. The element 10 may be provided with a shoulder 13 adjacent to the front surface of the flange 11, such shoulder serving to strengthen the element.

The element 10 is recessed so as to form a deep annular chamber 14; the operation of forming the chamber 14 leaves a post 15, coaxial with the element 10 and with the chamber. The outer wall 16 of the chamber 14 is stepped back so that the height of post 15 is greater than that of such wall. See Fig. 2. The outer end of post 15 is provided with a depression 17, which is shown here to be conical, but which may be cup shaped is desired.

The outer wall 16 of the chamber 14 is provided with a tapped hole at 18 for a set screw 19 which is shown in Fig. 1 to have an enlarged knurled head to facilitate manipulation and also a slot for a screwdriver.

A sleeve 20 is slidably carried within the annular chamber 14. The front end of the sleeve is provided with a diametric slot at 21 (see Figs. 1, 2, and 4). The bore of the sleeve 20 is substantially equal in diameter to the post 15 from the rear end of the sleeve nearly to the front end thereof, where, at 22, the bore is of slightly reduced diameter. The sleeve 20 is provided with a circumferential groove 23 (see Fig. 2) near its rear end and so positioned that when the sleeve—the set screw 19 having been sufficiently retracted—is inserted into the chamber 14 until the sleeve strikes the bottom thereof the groove 23 is in register with the inner end 24 of the set screw.

Carried within the sleeve between the depression 17 of post 14 and the constricted part of the bore of the sleeve at 22, as best illustrated in Fig. 2 is a ball 25 made integral with a stud 26 which latter protrudes beyond the sleeve and terminates with a threaded end 27. A flange 28 is provided on the stud 26 at the rear of the threaded end portion.

The groove 23 of the sleeve 20 is of curved or sector-like cross section and the end 24 of the set screw 19 is turned down so as to fit within the groove when the set screw 19 is driven tightly against the sleeve; however, when the set screw is slightly retracted, a small amount of axial movement of the sleeve may be had. Thus on release of the set screw the universally held ball 25 may be rotated and moved angularly within the slot 21; but when the sleeve is locked against the bottom of chamber 14 by the cam action of the advancing end 26 of the set screw 19 the constricted portion of the bore acts as one jaw of a vise against the ball 25, the other jaw being the bottom of the depression 17 of post 15, and serves to prevent movement of the ball. Thus the axis of the stud may be selectively disposed in any of a great variety of angular positions with respect to the base assembly, and then locked by means of set screw 19 against further movement.

The element 10 of the base assembly may be attached to a wall by means of screws or nails through the holes 12, 12; and, as an optional means for attaching the element 10 to a wall I provide near the top of flange 11 a bracket 29, of well known construction, which is secured to the rear side of the flange within a countersink (see Fig. 3) by means of screws 30, 30, and which serves as a guide for a nail 31 in the usual manner. Fig. 4 illustrates the mount attached to a wall, the latter being indicated by a dotted line 32.

As a means for supporting a photograph, painting, print or other picture, or other material to be displayed, there is provided a plate 33, which may be a disk, as shown in the drawing, or of other shape, having a boss 34 at its rear center, the boss having a tapped center bore suitable for receiving the threaded end 27 of the stud 26.

The plate has a plurality of keyways 35, 35 which may be, as shown, vertically arranged keyhole slots by means of which a picture or other object, such as 36 (in dotted lines in Fig. 4), having headed studs 37, 37 fixed to the rear side, may be anchored to the plate 33. It will be obvious that any of a considerable variety of equivalent means for anchoring a picture or other object to the plate 33 may be used instead of the specific means illustrated.

Fig. 4 shows in solid lines one position, and in dotted lines another position of the plate 33 and stud 26.

Fig. 5 shows a fragmentary view of an extension element 38, one or more of which may be employed in connection with the mount for the purpose of increasing the effective length of stud 26. At one end the element 38 is provided with a flared cup 39 internally threaded to receive the threaded end 27 of stud 26, and near the other end with a flange 40, the end portion 41 being threaded, the parts 40 and 41 being respectively similar to parts 26 and 27 of stud 26. By employing one or more of these extension elements, the range of angular adjustment of the plate 33, and hence of the object supported by it can be increased to practically 360 degrees. If desired, a second diametric slot at right angles to the slot 21 may be provided to permit the plate 33 to be adjusted laterally in a plane at right angles to that of slot 21.

I claim:

A display mount comprising a cup-shaped base adapted to be attached to a support, said base having a coaxial post thereon, the outer end of said post being recessed, a plate for supporting an article to be displayed, means for disposing said plate at various angular positions with respect to said base and for locking said plate in such positions, said means comprising a rod rigidly attached to the rear of said plate and having a ball end fitted into the recess of said post, a cup surrounding said ball end and said post and fitted within said base, said cup being slotted to receive said rod in various angular positions thereof, said cup having a circumferential groove therearound, and a set screw threaded through the base and engaging said groove for the purpose of moving said cup axially against said ball as said set screw is tightened.

BERENICE ABBOTT.

References Cited in the file of this patent

UNITED STATES PATENTS

| Number | Name | Date |
|---|---|---|
| 420,968 | Seaman | Feb. 11, 1890 |
| 538,534 | O'Neill | Apr. 30, 1895 |
| 698,272 | Glover | Apr. 22, 1902 |
| 1,166,018 | Soresi | Dec. 8, 1915 |
| 2,012,941 | Corron et al. | Sept. 3, 1935 |
| 2,167,014 | Verderber | July 25, 1939 |
| 2,439,009 | Kujawski | Apr. 6, 1948 |

FOREIGN PATENTS

| Number | Country | Date |
|---|---|---|
| 598,561 | France | May 22, 1925 |